June 20, 1933.  S. B. WINN  1,915,143
PLATFORM ELEVATING MECHANISM
Filed Dec. 18, 1930  2 Sheets-Sheet 1
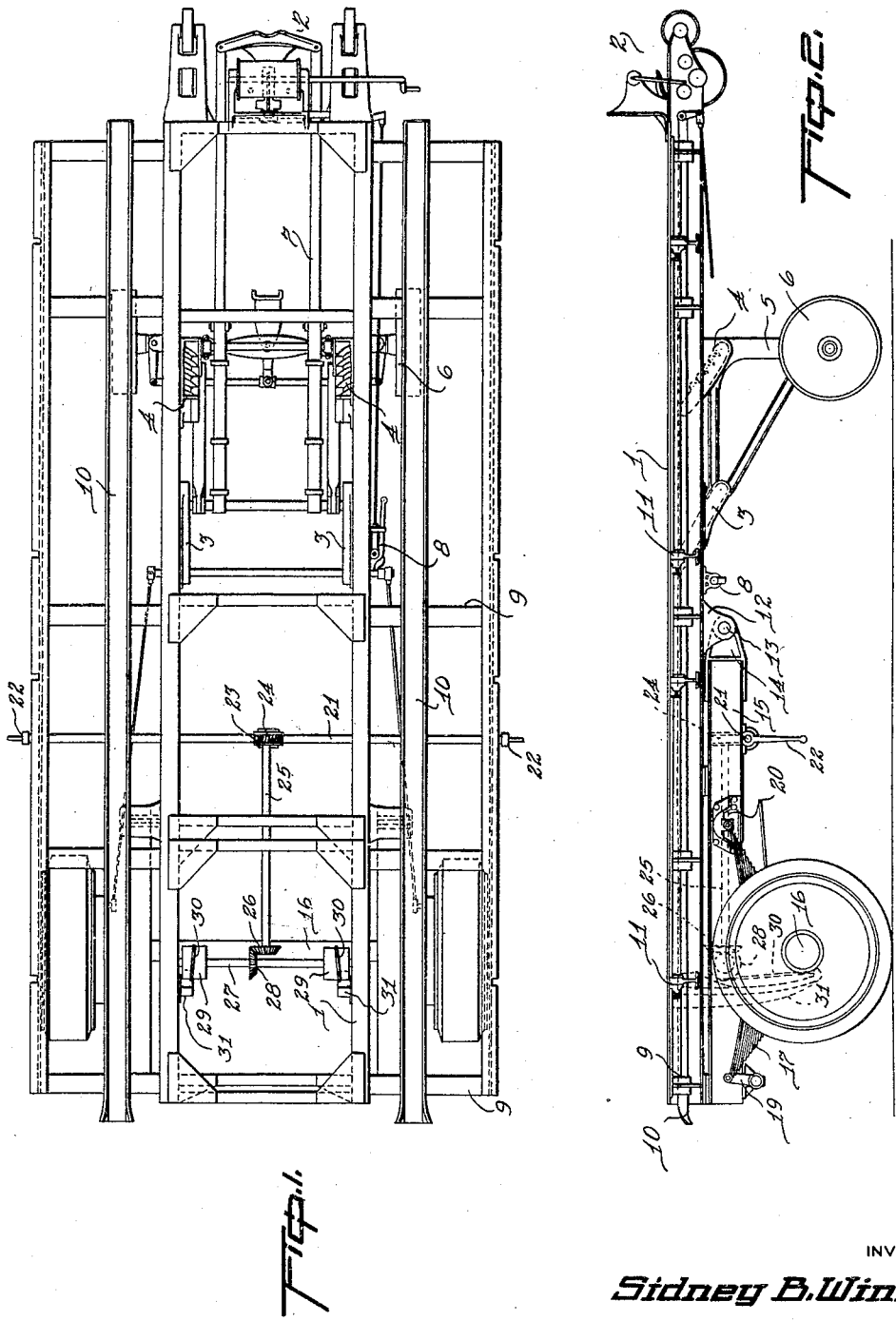
INVENTOR
*Sidney B. Winn*
BY
ATTORNEYS June 20, 1933. S. B. WINN 1,915,143
PLATFORM ELEVATING MECHANISM
Filed Dec. 18, 1930 2 Sheets-Sheet 2
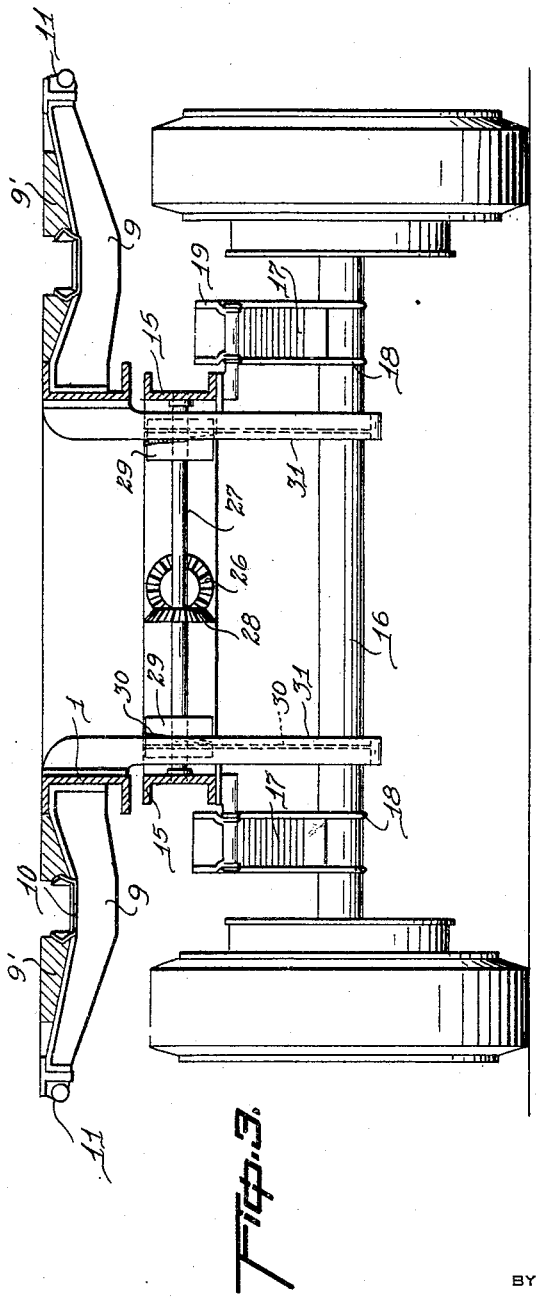
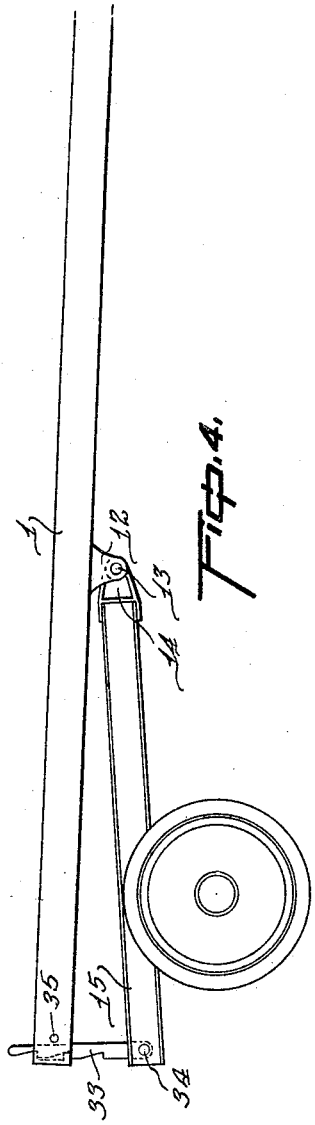
INVENTOR
Sidney B. Winn
BY
ATTORNEYS Patented June 20, 1933

1,915,143

UNITED STATES PATENT OFFICE

SIDNEY B. WINN, OF LAPEER, MICHIGAN

PLATFORM ELEVATING MECHANISM

Application filed December 18, 1930. Serial No. 503,259.

The present invention pertains to a novel platform elevating trailer of the type designed for transporting freight, the primary object being to devise a trailer having a hinged frame provided with members to accommodate the various containers of freight, such as the large sealed boxes used by wholesale houses in transcontinental shipments, these boxes usually being provided with castors or rollers at their four corners. The hinged frame avoids considerable difficulty and inconvenience in loading and unloading by making it possible to adjust the automobile carrying members to a height which corresponds to the height of the loading or unloading platforms whereby the freight may be readily loaded or unloaded.

Another object of the present invention is to devise a trailer having a hinged frame provided with members to accommodate the carrying of automobiles, the trailer being provided with a mechanism for raising or lowering the automobile supporting members. The mechanism is preferably manually operated to facilitate loading and unloading the automobiles by adjusting the automobile carrying members to a height corresponding to the height of the loading or unloading platform.

Another object of the present invention is to devise a trailer having coupling means for connecting the same to a tractor and a platform for carrying a load, the trailer frame being hinged to and provided with a mechanism for raising or lowering the load carrying platform whereby it may be adjusted to correspond to the height of a loading or unloading platform to conveniently permit the load to be moved onto or off the trailer.

With these and other ends in view, the invention consists in the matters hereinafter set forth and more particularly pointed out in the appended claims, reference being had to the accompanying drawings, in which Figure 1 is a top plan view of the present trailer;

Fig. 2 is a side elevation of the present trailer;

Fig. 3 is a transverse cross sectional view illustrating the platform elevating mechanism, and Fig. 4 is a diagrammatic view illustrating the platform in an elevated position.

Like characters are employed throughout to designate the corresponding parts.

The numeral 1 indicates a trailer frame having any suitable coupler mechanism 2 whereby it may be connected to a tractor. Leg guides 3 and racks 4 attached to the frame 1 support the legs 5 having wheels 6 mounted thereon. The wheels 6 are adapted to be raised or lowered by any suitable type of push rod assembly illustrated in my prior patents, the push rod assembly being illustrated in general by the numeral 7. The coupler mechanism 2 is of any suitable type illustrated by my prior patents and includes the usual brake setting mechanisms, a side hand brake 8 also being provided to act upon the rear wheels presently to be described.

A plurality of outwardly projecting arms 9 are secured to the frame 1 and support the channel members 10 which are spaced to accommodate the wheels or rollers of a transcontinental shipment box or the wheels of an automobile, if the device should be used to transport automobiles from the factory to the dealer, a plank platform 9' being provided to facilitate the use of the present device in carrying various smaller containers of freight. The outer ends of the arms 9 are provided with set screw devices 11 which may be utilized to secure the automobiles in place in the channel members 10, or may be used to secure a covering in place or they may be used to secure a flat platform in place in case it should be found desirable to employ the trailer for other purposes than transporting automobiles.

Brackets 12 are mounted upon the lower side of the frame 1 and support a pivot bolt 13 which carries a bracket 14 upon a secondary frame 15. The rear axle 16 of the trailer is connected to the secondary frame 15 by means of the usual spring assembly including the spring 17, clips 18, shackles 19 and brackets 20.

A transversely extending shaft 21 is rotatably mounted in the secondary frame 15 and extends outwardly on each side thereof, the outwardly extending ends being provided with hand cranks 22. A worm 23 is mounted centrally on the shaft 21 and meshes with a worm gear 24 carried by a longitudinally extending shaft 25 which is provided with a bevelled gear 26 at its opposite end. A transversely extending shaft 27 is mounted in the secondary frame 15 and is provided with a bevelled gear 28, the bevelled gear and worm and gear combining to cause rotation of the shaft 27 by rotation of the hand cranks 22. Pulleys 29 are fixedly mounted upon the shaft 27 to rotate therewith and are provided with cables 30 having one end permanently attached thereto.

Downwardly extending curved arms 31 are mounted upon the frame 1 adjacent the pulleys 29 and are connected to the free end of the cable 30, the purpose of which arms will become apparent as the operation of the device is described.

To raise or lower the end of the frame 1 so that the channel member 10 could be adjusted to a position level with a loading or unloading platform it is necessary to operate the hand cranks 22. Operating the hand cranks 22 causes rotation of the shaft 27 by means of the worm 23, worm gear 24, shaft 25, and the bevelled gears 26 and 28. Rotation of the shaft 27 causes the cables 30 to be wound around the pulleys 29 so that the distance between the pulley and the lower ends of the arms 31 is decreased and the upper end forced upwardly. The coupling mechanism 2 supports the forward end of the trailer and therefore the frame 1 and the secondary frame 15 are hinged on the pivot bolt 13 whereby the frames are caused to assume the position diagrammatically illustrated in Fig. 4 of the drawings. By reversing the direction of rotation the end of the frame 1 may be lowered to the normal position illustrated in Fig. 1 of the drawings.

To relieve the holding strain from the above described raising and lowering mechanism there is provided a simple form of holding means which is in the nature of a ratchet faced arm 33 which is pivoted as at 34 to the frame 15 so that it may be moved on its pivot so that it may engage the trailer frame 1 as illustrated in Fig. 4. A retractable pin 35 is slidably mounted in the trailer frame 1 so that when the ratchet arm is in engagement with the frame 1 the pin 35 may be pushed in so that the end of the pin engages the back of the arm in a manner to prevent the arm from accidentally being disengaged from the frame 1.

Although a specific embodiment of the present invention has been illustrated and described, it will be understood that various changes may be made within the scope of the appended claims without departing from the spirit of the invention and such changes are contemplated.

What I claim is:—

1. In combination, a tractor trailer body having a support at one end, a wheeled truck arranged beneath the opposite end of the body and having pivotal connection with the trailer body intermediate its ends, and means associated with the truck and body for elevating such end of the trailer body relative to the wheeled truck, said means including downwardly projecting arms on said trailer, and cables on said truck connected to said arms so that tensioning of said cables moves said arms vertically.

2. In combination, a tractor trailer body having a support at one end, a wheeled truck arranged beneath the opposite end of the body and having pivotal connection with the trailer body intermediate its ends, arms mounted on said trailer body and extending downwardly beneath said truck, cables on said truck and connected to said arms so that tensioning of said cables moves said arms vertically for elevating such end of the trailer body relative to the wheeled truck, and cooperating latch elements between the free end of the wheeled truck and the adjacent end of the trailer for maintaining the latter in elevated position.

3. In combination, a tractor trailer having a pair of horizontally extending body beams at opposite sides, a support for the forward end of the trailer, a wheeled truck arranged below the rear end of the trailer body and having parallel beams arranged in vertical alignment with the body beams of the trailer and upon which the latter normally rest, pivotal connections between the inner ends of the truck beams and the intermediate portions of the trailer body beams, and cooperating means between the wheeled truck and rear end of the trailer for elevating the latter relative to the truck, said means including arms on said trailer and extending downwardly beneath said truck beams, and cables on said truck attached to said arms so that tensioning of said cables moves said arms vertically.

4. In combination, a tractor trailer having a ground engaging support at its forward end, a wheeled truck arranged below the rear end of the trailer and having its forward end pivotally connected with the trailer for movement about a horizontal axis, the truck including parallel sills which normally engage a substantial portion of the trailer and constitute a support for the latter, vertically extending arms rigid with the rear end of the trailer at opposite sides and extending downwardly below the beams of the truck, a drum journalled in the truck, and flexible elements operatively connected with the lower ends of the arms and adapted to be wound upon the drum whereby the arms are raised to lift the rear end of the trailer relative to the truck.

5. In combination, a tractor trailer having a ground engaging support at its forward end, a wheeled truck arranged below the rear end of the trailer and having its forward end pivotally connected with the trailer for movement about a horizontal axis, the truck including parallel beams which normally engage a substantial portion of the trailer and constitute a support for the latter, vertically extending arms rigid with the rear end of the trailer at opposite sides and extending downwardly below the beams of the truck, a drum journalled in the truck, flexible elements operatively connected with the lower ends of the arms and adapted to be wound upon the drum whereby the arms are raised to lift the rear end of the trailer relative to the truck, and latch means between the free end of the truck and rear end of the trailer to maintain the latter in elevated position.

In testimony whereof I affix my signature.

SIDNEY B. WINN.